(12) United States Patent
Ropolyi et al.

(10) Patent No.: US 7,277,702 B2
(45) Date of Patent: Oct. 2, 2007

(54) TRACING METHOD AND SYSTEM

(75) Inventors: Róbert Ropolyi, Budapest (HU); Gabor Járó, Budapest (HU); András Pfening, Budapest (HU); Balázs Bertenyi, Budapest (HU); Gyula Bodog, Budapest (HU); Son Phan-Anh, Budapest (HU); Pál Köpösdi, Budapest (HU); Jarmo Ilkka Saari, Turku (FI); Gábor Mittweg, Budapest (HU); Gabor Bajko, Budapest (HU)

(73) Assignee: Nokia Corporation, Espoo (FI)

( * ) Notice: Subject to any disclaimer, the term of this patent is extended or adjusted under 35 U.S.C. 154(b) by 94 days.

(21) Appl. No.: 10/473,983

(22) PCT Filed: Apr. 4, 2002

(86) PCT No.: PCT/IB02/01099

§ 371 (c)(1),
(2), (4) Date: Nov. 14, 2003

(87) PCT Pub. No.: WO02/082729

PCT Pub. Date: Oct. 17, 2002

(65) Prior Publication Data
US 2004/0121775 A1    Jun. 24, 2004

(30) Foreign Application Priority Data
Apr. 4, 2001  (DE) ............... 101 16 786
Aug. 28, 2001 (GB) ............... 0120807.3
Jan. 14, 2002 (GB) ............... 0200729.2

(51) Int. Cl.
H04Q 7/20  (2006.01)
(52) U.S. Cl. ............. 455/433; 455/9; 455/423; 455/424; 455/425; 455/445; 709/238; 709/223; 370/352; 370/465

(58) Field of Classification Search ............... 455/9, 455/423, 424, 425, 433, 445; 709/238, 223; 370/352, 465
See application file for complete search history.

(56) References Cited

U.S. PATENT DOCUMENTS 5,442,682 A * 8/1995 Svedin et al. ............ 455/435.2

(Continued)

FOREIGN PATENT DOCUMENTS

EP    1 109 368 A2    6/2001
WO    WO 00/39674     7/2000

OTHER PUBLICATIONS

Digital Cellular Telecom System (Phase 2+), Subscriber and Equipment Trace (GSM 12.08, V5.1.1, rel 2000), 3G TR23.821, V1.0.1, Jul. 2000, pp. 1-62, SP002175634.*

(Continued)

Primary Examiner—Steve M. D'Agosta
(74) Attorney, Agent, or Firm—Squire, Sanders & Dempsey L.L.P.

(57) ABSTRACT

A method for tracing a session or call in a network environment, comprising the step of transmitting a trace invocation from a control plane network element to another control pane network element or a user plane network element. According to a first aspect, a trace report is generated in the S-CSCF of the called party. This overcomes the lack of being able to provide detailed information about the interworking between the User Equipment (UE) and the IMS, in setting up IP multimedia sessions. According to a second aspect trace reports are generated in all the network functions involved in session setup.

21 Claims, 7 Drawing Sheets

U.S. PATENT DOCUMENTS

| | | | |
|---|---|---|---|
| 6,466,585 B1 * | 10/2002 | Le | 370/465 |
| 6,640,105 B1 * | 10/2003 | Shin | 455/453 |
| 6,879,820 B2 * | 4/2005 | Bjelland et al. | 455/406 |
| 6,888,839 B1 * | 5/2005 | Scoggins et al. | 370/410 |
| 2001/0027490 A1 * | 10/2001 | Fodor et al. | 709/238 |
| 2002/0120729 A1 * | 8/2002 | Faccin et al. | 709/223 |
| 2002/0126654 A1 * | 9/2002 | Preston et al. | 370/352 |

OTHER PUBLICATIONS

"Megaco/H248: A New Standard for Media Gateway Control", T. Taylor, IEEE Communications Magazine, vol. 38, No. 10, Oct. 2000, pp. 124-132, XP000969735.

"Digital Cellular Telecommunications System (Phase2+); Subscriber and Equipment Trace (GSM 12.08 version 5.1.1 Release 1996)", ETSI TS 101 627 V5.1.1, Jul. 1998, XP002204567.

"3$^{rd}$ Generation Partnership Project; Technical Specification Group Services and System Aspects; Architecture Principles for Release 2000 (Release 2000)", 3G TR 23.821 V1.0.1, Jul. 2000, pp. 1-62, XP002175634.

"SIP-Specific Event Notification", A. Roach, Internet Draft, <Draft-IETF-SIP-EVENTS-00.TXT>, IETF, Jul. 2001, pp. 1-32, XP002189884.

* cited by examiner

TRACING METHOD AND SYSTEM

FIELD OF THE INVENTION

The present invention relates to a method and system for tracing a session or call or other subscriber activities in network elements handling an IP multimedia communication. Furthermore, behavior of network elements can be traced using the present invention. "Session trace" is an extension of the subscriber and the equipment trace function defined by ETSI TS 101 627 (GSM 12.08). Additionally, a way is introduced of activating the trace from a device controller to a controlled device, like from control plane network elements such as from a Media Gateway Controller (MGC) or Media Gateway Control Function (MGCF) or Media Resource Function Controller to a user plane network element such as a Media Gateway (MGW) or Media Resource Function Processor (MRFP).

BACKGROUND OF THE INVENTION

In GSM networks, the trace facility enables customer administration and network management to trace the activities of various entities when specific events occur. This facility enables the tracing of information available to the network concerning the call path used by the associated entity. The information that could be in a trace record may comprise e.g. the identity of the originating and terminating equipment of the concerned mobile or fixed subscriber, the identity of the incoming and outgoing circuits of the nodes involved, supplementary services invoked, interface messages, etc. The trace facility is a useful maintenance aid and development tool which can be used during system testing and proving. It may be used by subscriber administration and network management for subscriber observation, e.g. following a customer complaint or on suspicion of equipment malfunction by the operator or at a request of the police (i.e. lawful interception). As the amount of information that can be collected for a single call is very large, network elements can limit the number of simultaneous traces by either rejecting a trace request or by only producing a sub-set of the information required.

An activation of a trace is an action taken by an operation system function (OSF) or an operation and maintenance center (OMC) through MMI (Man Machine Interface) commands to allow a trace to be produced for a particular IMSI (International Mobile Subscriber Identity) or IMEI (International Mobile station Equipment Identity) when an invocation event occurs. An invocation of a trace is an event relating to a particular IMSI or IMEI, which occurs in the network and which causes data to be collected in a trace record in circumstances where the trace has been activated for that IMSI or IMEI. The trace action and record layout is defined by the trace type parameters of the corresponding trace request.

A trace can be invoked in a Base Station Subsystem (BSS) of the GSM network when an invoking event specified in a trace type parameter of a trace request occurs and a BSS record type is set to a value indicating that the tracing function is activated. Furthermore, a trace can be invoked by sending a corresponding message from a Mobile Switching Center (MSC) to the BSS. When the BSS receives this message, it starts tracing the necessary fields as specified in the BSS record associated with the specified BSS record type.

If the subscriber is roaming within its home network, the trace request is forwarded to the Visitor Location Register (VLR) where the subscriber is registered via a message indicating an active trace mode. If the subscriber is roaming in a foreign mobile network, the home network subscriber trace request is stored in the Home Location Register (HLR), but the trace is not active in the VLRs of the home network. In order to trace the IMSIs of roaming subscribers in the own network, a list of those IMSIs plus the associated subscriber trace parameters must be stored in the VLR. The network operator may then activate a trace for any foreign roaming IMSI from an OSF by invoking a corresponding management function, i.e. transmitting a trace request to the respective VLR serving the subscriber. If the location of the subscriber is not known, it is necessary to activate the trace in all VLRs where the subscriber may be located. The trace request is stored in the VLR. If the subscriber subsequently roams into the VLR area, the subscriber trace will be activated in the visited network.

In order to achieve access independence and to maintain a smooth interoperation with wireless terminals across the Internet, Internet Protocol multimedia subsystems (IMSs) have been developed with an attempt to conform to Internet standards set out be the IETF (Internet Engineering Task Force). Therefore, interfaces specified conform as far as possible to IETF standards for those cases where an IETF protocol, e.g. the Session Initiation Protocol (SIP), has been selected.

The IMN enables operators of mobile networks to offer their subscribers multimedia services based on and built upon Internet applications, services, and protocols. There are two possible scenarios to provide services, i.e. via the service platform in the home network or via an external service platform (e.g. a third party or visited network). Call State Control Functions (CSCFs) are provided which can act as Proxy CSCFs (P-CSCFs), Serving CSCFs (S-CSCFs) or Interrogating CSCFs (I-CSCFs). The P-CSCF is the first contact point for a user equipment within the IMN. The S-CSCF actually handles the session states in the network. The I-CSCF is mainly the contact point within an operator's network for all connections destined to a subscriber of that network operator. A more detailed description of the IMN can be gathered from the 3GPP specification TS 23.228.

However, the Third Generation Partnership Project (3GPP) has not specified any trace solution for the Internet Protocol (IP) Multimedia Subsystem (IMS) of Universal Mobile Telecommunications System (UMTS) networks. Therefore, no trace is possible in multi-vendor networks.

Furthermore, the H.248 standard does not disclose how to activate the tracing in the MGW, which is not possible using prior art techniques if the user and control planes are separated.

SUMMARY OF THE INVENTION

It is therefore an object of the present invention to provide a "session trace" functionality for IP Multimedia (IM) sessions.

This object is achieved by a tracing method as defined in claims 1, 8 and 12, a system for providing a trace function as defined in claim 21, and a communication system defined in claims 13 and 17.

Accordingly, a "session trace" feature is provided as a good maintenance tool for troubleshooting or testing new features. The "session trace" can be invoked for "test calls" (test sessions) made by subscribers that are put under trace, according to the subscriber and equipment trace concept.

Besides troubleshooting, the session trace functionality may also be used for supporting a lawful interception with detailed session information.

The session trace, as an extension of the subscriber trace concept, enables the generation of trace reports in all network functions involved in session setup, e.g. the S-CSCF and the P-CSCF of a traced IM subscriber, as well as in the S-CSCF and P-CSCF of the other party in mobile-to-mobile calls, in Breakout Gateway Control Function (BGCF), MGCF and MGW in case of PSTN/GSM terminated calls, and in I-CSCFs (optionally) used in IM session setup.

Advantageous further developments of the invention are defined in the dependent claims.

BRIEF DESCRIPTION OF THE DRAWINGS

In the following, the invention is described in greater detail on the basis of a preferred embodiment with reference to the drawing figures, in which.

DESCRIPTION OF THE PREFERRED EMBODIMENTS

Figure 1:
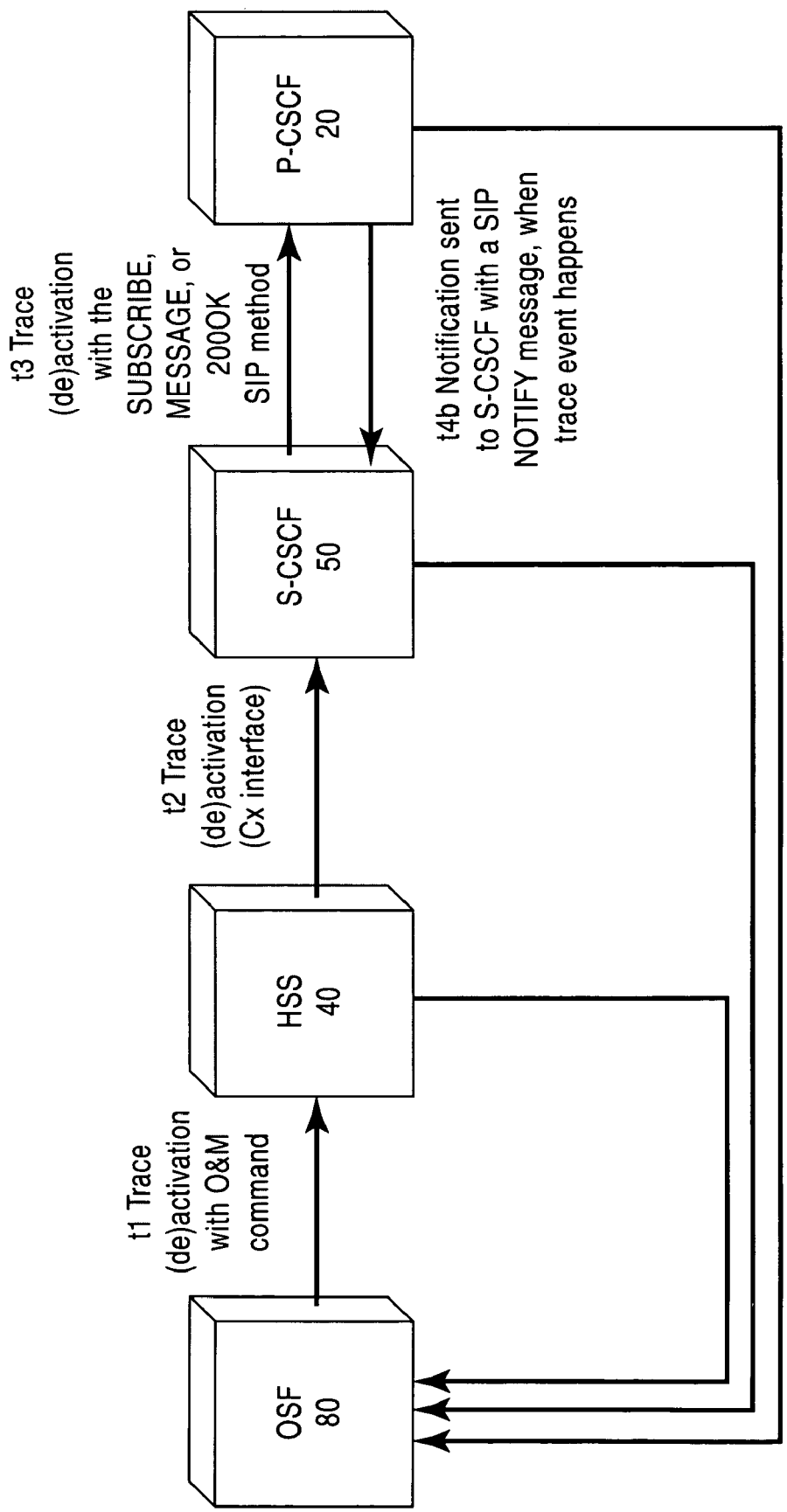
FIG. 1 shows an overview of elements and messages for implementing trace function in an IP multimedia system.

The preferred embodiments will now be described for cases where a session trace activation is done in an IMS using SIP messages for carrying the trace invocation information in the IM session.

When subscribers roam to visited networks, the S-CSCF is located in the home network, while the visited network supports a P-CSCF. The P-CSCF enables the session control to be passed to the home network based S-CSCF which provides the service control. The I-CSCF can be used in the SIP signaling path to shield the internal structure of a network from other networks. Furthermore, the MGC or MGCF controls the parts of the call state that pertain to connection control for media channels in an MGW and communicates with the CSCFs. The MGW terminates media streams from a packet network, e.g. an IP network, supports media conversion, bearer control, and payload processing, and interacts with the MGCF for resource control.

For utilizing the subscriber and the "session trace" in an all-IP mobile network, the following provisions may be made in the network. Activation and/or deactivation of the "session trace" may be performed centrally in the Home Subscriber Server (HSS) which substitutes the Home Location Register (HLR) when the IMS is implemented. The HSS is the master database for a given user and contains the subscription related information to support the network entities actually handling calls or sessions. Activation of the "session trace" may be performed from the HSS to the Serving-Call State Control Function (S-CSCF) and Proxy-CSCF (P-CSCF) of the traced subscriber. The S-CSCF and the P-CSCF may store subscriber related data, so that the "session trace" activation information can be stored there for the registration period. In the P-CSCF, a direct activation by administration means may be provided as well, for tracing visitor subscribers by the visited operator's own decision. The "session trace" for the IM session may be invoked in the other network functions, participating in the IM session setup, i.e. S-CSCF and P-CSCF of the called party, I-CSCF, BGCF, MGCF and MGW. Hereby it is noted that a simplified implementation of the session trace, the "IM subscriber trace", is possible if the trace activation/invocation is limited for the S-CSCF and P-CSCF of the traced subscriber.

"Session trace" reports may be created in a traced session and sent to the Operations Systems Function (OSF). The "session trace" reports contain identification information of the traced subscriber/session. In the S-CSCF of the traced subscriber, this may be the trace reference ID, the public or private ID of the IM subscriber, the SIP call ID and the invoking operator's ID, in case of the other network functions, it is the SIP call ID and the invoking operator's ID. The "session trace" reports may be sent to the own OSF system, in each operator's network. The "session trace" reports may be processed in the OSF for an IM session by combining the reports received from several network elements, which implement the network functions of IMS. Wherein the combination of "session trace" reports is required for the session trace only.

Thus, in multi-vendor networks, the required standardized protocols need to include the message parameters required for trace invocation.

In case of an IM session setup using several operators network, the trace activation might be sent or not from the S-CSCF to the P-CSCF in another network, depending on the mutual agreement between the operators. The trace invocation may be sent over the network borders in the SIP messages. The trace invocation info sent may contain the identification of the Public Land Mobile Network (PLMN), where the trace was activated. Evaluating this PLMN ID, the network elements may or may not provide trace reports for the session, depending on a mutual trace-data-provisioning agreement cooperation between the operators (whether they cooperate in trouble shooting)

In case of a trace provisioning in the user plane, with tracing in the MGW or the Multimedia Resource Function MRF (not shown in the figures), the trace feature may provide detailed information about user plane and the used physical resources. It may be very useful, especially, when some problem occurs in the user plane side as the user plane and the control plane are separated in the 3GPP release 4 and release 5 UMTS networks.

In the MGC, it is hardly feasible to collect information about the physical resources of the MGW. The current standards describe only how the MGC reserves the logical resources of the MGW. However, for fault finding, or for lawful interception reports also the information related to the physical resources, e.g. type of media, is essential.

For troubleshooting and for testing purposes, information on user plane and its physical resources is needed. Furthermore, the "session trace" functionality in MGW may be used for lawful interception reports.

The "session trace" is activated on a specific subscriber or an equipment, but the MGW does not know anything about the subscriber, thus "session trace" cannot be activated locally in the MGW. One possible solution is if the MGC sends the "session trace" activation information to the MGW in the beginning of the call via the H.248 protocol. When the MGW receives the "session trace" activation information it starts collecting detailed information on the user plane and the physical resources of that call. The "session trace" activation information can be sent when the MGC request the termination ID reservation from the MGW. Practically this "session trace" activation information may be added to the ADD command.

Furthermore, there may be a standalone procedure to inform the MGW about the "session trace". This standalone procedure is useful when reporting is needed from the MGW in an ongoing call. This situation may usually happen in lawful interception cases. Such standalone "session trace" activation information may be included in the MODIFY command. The trace activation in MODIFY command is also needed when termination is removed from the context in the MGW and new termination is added to the same context (like in Handover case).

The "session trace" activation sent to the MGW may contain the trace reference, UE identity (Public or Private User ID), trace type (which defines what kind of traces is needed and how the reports shall be transferred to OSF) and OSF address for identification purposes.

The "session trace" functionality may be deactivated in the MGW when the MGC requests to release the reserved context. Furthermore, there may be a standalone procedure for deactivating trace in the MGW.

Alternatively to the trace activation from the MGC, the MGW could report detailed information on the user plane and the used physical resources to the MGC for every call but this would require big load from the MGC and the interface between the MGW and the MGC.

The same procedures apply when (de-)activating "session trace" from the MRF controller (MRFC) to the MRF processor (MRFP) of IMS or other network elements with separate control and user plane functionality.

FIG. 1 is an overview about the proposed information provision (trace) process. In this detailed description the information provision process is referred to by the term tracing, the tracing comprises processes such as trace activation and trace report generation. The elements comply to a 3G systems. Internet Protocol (IP) multimedia subsystem (IMS).

Some other elements such as various gateway entities (e.g. the Media Gateway Control Function MGCF, Media Gateway MGW, the Signalling Gateway SGW) or various application servers may also be provided. However, illustration or more detailed description of these is not required for understanding of the invention. Those interested may gather a more detailed description of the IMN from the 3GPP (3rd Generation Partnership Project) specification TS 23.228.

In the beginning of provision of a subscriber trace in an all-IP mobile network the first step is typically activation of the trace function. In general, trace activation is suggested to be performed from a control plane network element to a user plane network element. Existing subscriber administration means can be used for initiating the activation procedure, e.g. those provided by the OSF entity 80. In such case the trace activation may happen through the following signal chain:

OSF-HSS-S-CSCF-P-CSCF.

More particularly, the OSF 80 may activate the trace function by communicating (t1) administration commands to the HSS 40. The received trace activation info may be stored in the HSS 40 as part of the subscriber profile. The trace may be activated for a particular subscriber or for a certain type activities a subscriber may have. A centralised activation may then take place in the HSS 40 as it is a centralised storage of subscriber data.

Subsequently the HSS 40 may instruct (t2) activation of the trace in the S-CSCF 50. The trace activation information can be downloaded from the HSS 40 to the S-CSCF 50 of the traced subscriber over a Cx interface. The trace activation information may be handled as part of the subscription data, so the same (generic) Cx interface messages/methods can be used for trace (de)activation that are used for subscriber profile download/update.

If the subscriber is already registered when the trace is activated in the HSS 40, the trace (de)activation may be forwarded immediately to the S-CSCF 50 thereby providing an 'any time' trace activation/modification. The 'Cx-Push' message may be used for this. If the subscriber was not registered when the trace is activated, the trace activation may be stored in the HSS 40. During a subsequent registration the trace activation information may then be downloaded from the HSS 40 to the servicing control entity S-CSCF 50 as a part of the subscriber's profile. This may be done e.g. in a 'Cx-Put-Resp' message (see FIG. 2).

The S-CSCF 50 stores the trace activation data until the trace is deactivated. Alternatively a predefined trace expiration time may be used.

Solutions implemented in accordance with the 3GPP standards may allow that a subscriber registers into more than one S-CSCF, by registering more than one profile with the network. In this case, it may be preferred to activate the trace in all of the involved S-CSCFs in a similar manner as described above.

It shall be appreciated that the steps for trace activation in the HSS 40 and the S-CSCF 50 are not essential for the operation of the present invention. Similar functions, if required, may also be implemented by using any appropriate solution.

In the herein described embodiments the trace can be activated also in other call state control functions such as the P-CSCF 20 in addition to the S-CSCF 50. The trace is activated at the P-CSCF 20 by a message (t3) communicated from the S-CSCF 50 to the P-CSCF 20. This may be implemented by means of an existing session initiation protocol (SIP) request.

For example, the S-CSCF 50 may send a SIP 'SUBSCRIBE' request to the P-CSCF 20. The 'SUBSCRIBE' request may contain several trace activation options. For example, the request may inform the P-CSCF 20 that trace reports are required for specific types of user activities such as the instant messaging only.

Figure 2:
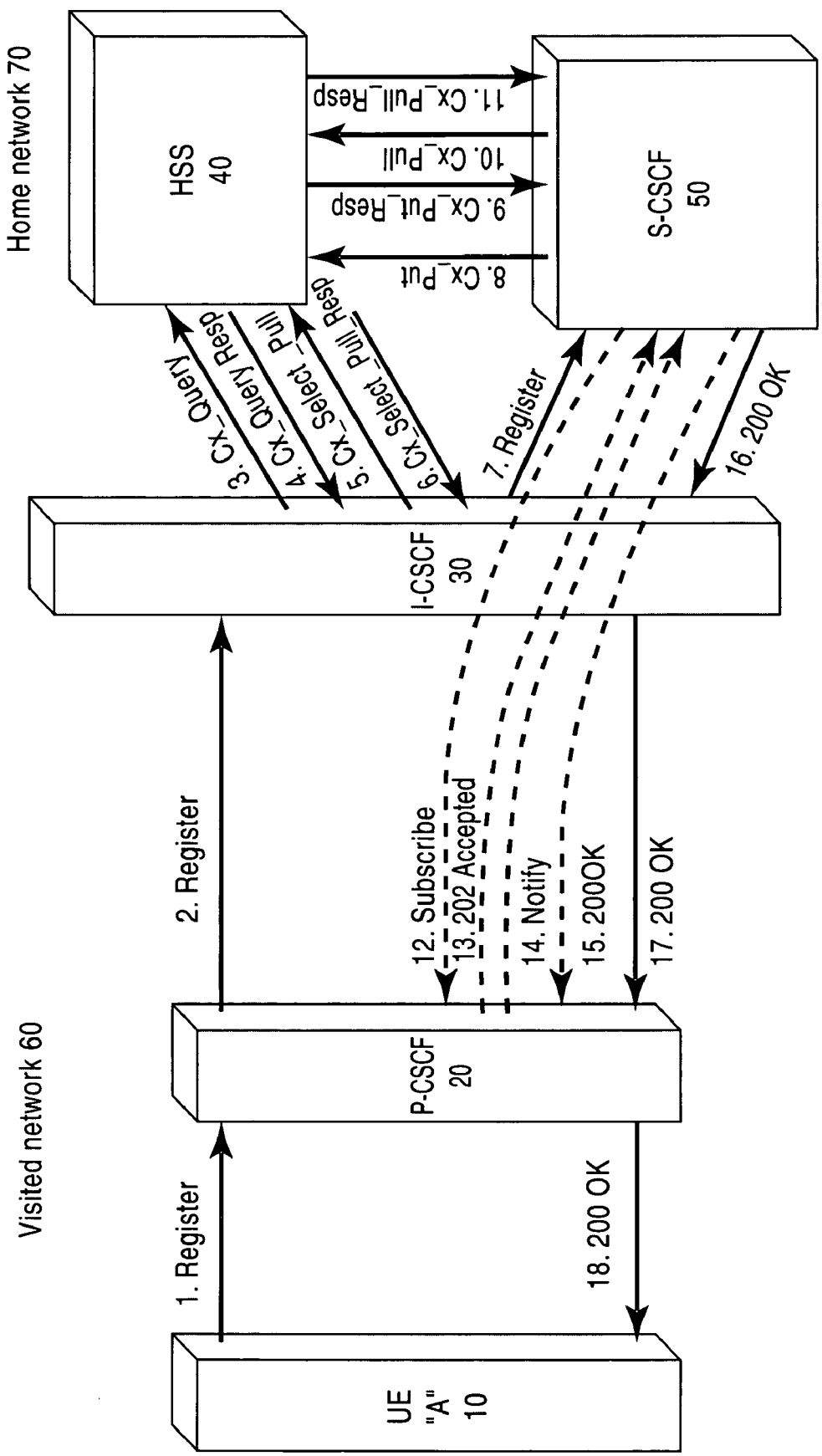
FIG. 2 shows a signaling diagram indicating an IM subscriber registration with trace invocation in the P-CSCF according to a first embodiment.

The trace activation subscription procedure will now be described in more detail with reference also to FIG. 2, wherein the numbers preceding the messages indicate their order. Although FIG. 2 illustrates a situation wherein the user equipment (UE) 10 is located in a visited network 60, operation regarding a subscriber who is in his home service area (i.e. the P-CSCF 20 and the S-CSCF 50 belong to the same public land mobile network (PLMN)) will be described first.

In this case, the S-CSCF 50 checks from the received trace options if the trace needs to be activated in the P-CSCF 20. If yes, a trace activation command is forwarded from S-CSCF 50 to P-CSCF 20, e.g. by using a SIP 'SUBSCRIBE' request. The S-CSCF 50 is aware of the P-CSCF 20 since the name of the P-CSCF 20 the subscriber is registered in was stored in the S-CSCF 50 during the registration phase of the subscriber and is kept as long as the registration is valid.

The procedure varies depending on whether the subscriber is registered or not when the trace is activated. If the subscriber is registered, the trace activation (the 'SUBSCRIBE' message) can be forwarded immediately. If the subscriber is not registered at the trace activation phase, the 'SUBSCRIBE' message is sent during registration, e.g. after the S-CSCF 50 receives the subscription profile in 'Cx-Put-Resp' (message 9, see FIG. 2). When the S-CSCF 50 detects from the subscriber data downloaded with the 'Cx-Put-Resp', it may send (message 12) the SIP 'SUBSCRIBE' request to the P-CSCF 20.

The trace subscription dialogue may consist of several messages. The 'SUBSCRIBE' request sent (message 12) to the P-CSCF 20 may bear the trace activation information. As with the trace information received by the S-CSCF 50, the information communicated to the P-CSCF 20 may include, without limiting to these, the public or private ID of the subscriber to be traced, a trace reference serving as the identifier for the trace reports, options for report invoking events, the IP address of the OSF and so on. The invoking event may be defined to be, for example, occurrence of a registration and/or SIP call and/or instant messaging and/or presence and/or emergency call and so on.

The trace information can be encoded to the event header of the 'SUBSCRIBE' request. The information may be coded as separate events (e.g. event:org.3gpp.trace-register, event:org.3gpp.trace-emergcall). According to a possibility, the events are coded as a general trace event with sub-events. Several SUBSCRIBE messages may also be used to require the trace for separate events. According to another possibility, the events are coded as a general trace event including definitions of optional sub-events.

The P-CSCF 20 may respond (message 13) with a '202 Accepted' message or with a '405 Method not Allowed' message if tracing of the subscriber is refused. Immediately after sending the '202 Accepted message', the P-CSCF 20 may send (14) a 'NOTIFY' message containing information that the subscriber has been put under trace in the P-CSCF 20. This message may also include information regarding the time the tracing shall be active (Expire header). The S-CSCF 50 may then send (15) a '200 OK response' message as a confirmation of receiving the NOTIFY message.

The S-CSCF 50 may send (16) the '200 OK' response for the 'REGISTER' request only after completion of the subscription dialogue, that is after having received the required acknowledgement messages 13 and 14. This way, the trace activation happens in the P-CSCF 20 before completing the SIP 'REGISTER' transaction and complete trace data collection can be ensured in the P-CSCF 20 already for the registration event itself.

The S-CSCF 50 is preferably adapted to evaluate, e.g. based on the domain of the P-CSCF 20, whether the trace activation needs to be forwarded or not.

The P-CSCF 20 may also be adapted to analyse—based on the domain of the sender S-CSCF—whether it accepts or rejects the received trace activation request. In case of positive decision, it may reply e.g. with the SIP '202 ACCEPTED' message, otherwise with a '405 Method not Allowed' message.

The trace deactivation can be done similarly but e.g. by sending a 'SUBSCRIBE' request with expiration time=0.

The activation of the trace function in a plurality of other entities of a subsystem can be done centrally, e.g. by the HSS 40. It shall, however, be appreciated that besides this, the OSF or any other entity providing general management functions may be able to generate direct trace activation commands.

The above described example related to a basic scenario wherein the subscriber was located in a home network and ignored some of the elements of FIG. 2. However, tracing of foreign visitors in a P-CSCF based on a decision of the visited operator is also possible. A possibility is that the operators cooperate for tracing subscribers. Another is that the visited operator makes a decision to activate the trace.

In the case of tracing co-operation, the operator of an S-CSCF needs to configure the S-CSCF so that it will send the 'SUBSCRIBE' message to a P-CSCF in another network. The S-CSCF may decide whether to send the request or not based on the analysis of the P-CSCF's domain name. The P-CSCF in the visited network is configured to accept the trace activation from the S-CSCF despite that fact that the request arrived from another PLMN. The P-CSCF may make this decision based on the analysis of the S-CSCF's domain name. It shall be appreciated that the tracing co-operation is an extension of the basic scenario wherein the S-CSCF does not send and the P-CSCF does not accept the trace activation to/from another PLMNs.

In the scenario shown by FIG. 2, a subscriber, i.e. the UE 10, is roaming in another PLMN, i.e. the visited network 60, while the HSS 40 and the S-CSCF 50 of the subscriber are located in the home network 70. The I-CSCF 30 is a contact point within an operator's network for all connections destined to a subscriber of that network operator and it is responsible for determining the S-CSCF 50 by querying the HSS 40.

FIG. 2 shows the trace activation in the CSCF 50 during registration (i.e. for situation wherein the trace has been activated in the HSS 40 before the customer starts registration). The registering is applied to a subscriber who is roaming in a foreign network, and the two operators have an agreement for trace cooperation. Therefore, the trace is activated in the P-CSCF 20.

The visited operator may also make a decision regarding the trace function. The visited network 60 may be provided with management means for activating trace operations for visiting subscribers. The activation may be done by administrative commands, e.g. sent from the OSF of the visited network to the P-CSCF 20. The trace may be put into active pending state if the given subscriber is not registered to that P-CSCF 20, and shall become active if such registration happens.

In response to a request for information a trace report will be generated. The report may be provided only after a traced event occurs. A report may regard the HSS 40 and/or S-CSCF 50 and/or P-CSCF 20 depending on the request. As shown by FIG. 1, the trace reports for traced events may be sent (t4*b*) to the OSF 80 from each of the control entities 20, 40 and 50. The trace reports are sent to the OSF 80, of which address is given in trace activation request.

The trace reports contain identification information of the traced subscriber and/or session. The trace report message may comprise a trace record header and a report body. For example, a trace report header may comprise the trace reference ID, the public or private ID of an IMS subscriber, and the unique identification of the event (e.g. to "from", "to" and "call ID" for a SIP call). The reported information is then contained in the report body.

At the end of the session, or right after a specific event, these reports shall be sent to the OSF 80 for analysis. Alternatively, the records can be stored locally and sent in a bulk transfer mode. The OSF 80 may then process the trace reports for an event (e.g. an IMS session) by combining the reports received from P-CSCF 20 and S-CSCF 50.

In accordance with a variation of the above embodiment, a SIP 'MESSAGE' request is used for communication of the request from the first controller entity (S-CSCF 50 in FIGS. 1 and 2) to the second controller entity (P-CSCF 20 in FIGS. 1 and 2). The SIP "MESSAGE" request provides a corresponding function to that of the known short message service (SMS). It is typically used when sending a text message between entities such as parties or network elements. A '200 OK' response may be given for the MESSAGE request in response to a successful reception thereof. When compared to the SUBSCRIBE/NOTIFY method, the main difference is that if MESSAGE requests are used, then no notifications are necessarily sent back to the first element. Instead, only the trace report is sent to the processor entity (i.e. the message t4b of FIG. 1 and messages 14 and 15 of FIG. 2 can be omitted). The MESSAGE request can be used e.g. if the trace information is not needed in the S-CSCF 50.

As will be explained below, the SUBSCRIBE request is typically followed by a NOTIFY request, this being a standard feature of the SIP. The trace can be invoked by sending subscriber ID, a trace reference, IP address of the processor entity to the P-CSCF 20. The NOTIFY part (that is a notification on the trace report) is not relevant because the real trace report should be sent to the OSF 80 or similar processor entity, such as the NMS of the GSM systems, where it is stored and analysed. Thus, the S-CSCF 50 can discard the NOTIFY request.

However, sometimes such notification can be useful (e.g. for an emergency call). Thus, if the the SIP subscription concept is used, the P-CSCF 20 may inform (t4b) the S-CSCF 50 about the status of the trace operation. The P-CSCF 20 may also notify the S-CSCF 50 about the traced events from which it has received the trace activation. The notification may happen via SIP 'NOTIFY' messages. These 'NOTIFY' messages shall contain at least the identification of the traced subscriber and the traced event (e.g. registration). The S-CSCF 50 may include the information gained from the 'NOTIFY' message into its own trace report generated about the event. In this way the S-CSCF 50 may inform the OSF 80 about the presence of an P-CSCF 20 trace record. Based on this the OSF 80 knows for which S-CSCF 50 trace record it has to look for a specific P-CSCF 20 trace record. This, in turn reduces the amount of processing required by the OSF 80.

The other advantage of receiving the notification in the S-CSCF 50 is that this enables the S-CSCF 50 to detect also the cases when e.g. the SIP session setup messages were blocked in the P-CSCF 20 so that there is no trace event to be detected in the S-CSCF 50. The S-CSCF 50 receives a trace notification also in such a case so that the S-CSCF 50 can send an "empty" trace report to the OSF 80, stating exactly this kind of failed session.

Still another advantage can be obtained in the case of emergency calls. Such calls are traditionally traced in the mobile networks, but in case of the IM subsystem, the current assumption is that the P-CSCF 20 will route the emergency calls directly to the emergency centres, i.e. without involving the S-CSCF 50. The P-CSCF 20 to S-CSCF 50 notification provides a way how to inform the home operator that their subscriber has made an emergency call while roaming in another network.

The notification can also be used advantageously if the P-CSCF 20 does not send trace records to the OSF 80. Instead, it may include all the relevant data into the 'NOTIFY' message sent to the S-CSCF 50. In this case, the S-CSCF 50 shall combine the received trace data with the data it has collected itself, possibly drop the redundant information and send a single combined report to the OSF 80 entity. This can, from a certain point of view, simplify the trace co-operation between operators, as the trace data can be analysed at one OSF 80 entity. This option may require that the trace information sent in the 'NOTIFY' is well defined enabling the interworking of S-CSCFs and P-CSCFs of different vendors.

When processing subscriber activities, the HSS 40, the S-CSCF 50 and the P-CSCF 20 may always check whether the trace is active for the given subscriber. This may be done for the calling and called party of SIP calls, and equivalently, for both the information sending and receiving parties in presence and instant messaging services. If the subscriber is under trace, the appropriate network functions shall start collecting detailed information about the events processed.

According to a further embodiment the trace instructions are forwarded from the second control entity to a third control entity. The instructions may be forwarded in response to a monitored event. Such event can be, for example, a call setup, certain type of call, call forwarding, or anything else when the address of the next network element is known from the event. In a manner similar to that shown in FIG. 2, the 'SUBSCRIBE' or 'NOTIFY' message may be sent before the '200OK' message. These messages could also be sent before any SIP message (e.g. 'REGISTER', 'INVITE') so that the operator can monitor its network behaviour in case of a given call type and on. By forwarding the trace invocation along the path of a call setup or registration message information can be collected about those network elements involved to the session. Therefore the information provision is not limited to subscriber specific activities only. This way the use of the above described type of messages between control entities can be used for troubleshooting in a chain of control entities.

It shall be appreciated that the dynamic event monitoring involving the relevant entities does not prevent use of the conventional management protocols for forwarding the collected evidences e.g. to a central data storage system, e.g. to a system forming part of a network management entity. This central collection of data can utilise an arbitrary combination of the management protocols and the control protocols utilised for involving the entities into the evidence collection. For example, it is possible that the entities involved send the collected evidences and/or notifications about the monitored events both to a central management entity and to that entity from which they have received the involving requests. This can be used for optimising the data collection, for example, minimising the overlapping in the reported evidences and facilitating the combination and presentation of the collected data in a central storage place. FIGS. 3 to 7 show the most generic cases in session setup, regarding the network borders. The IM session may use up to four different networks, but the network elements participating in the IM session setup can be in the same network as well. The I-CSCFs may be there or not, e.g. depending on the decisions of the operators to hide the internal network structure from each other. In case of sessions (calls) originated from a PSTN or GSM network, the interconnection point can be either in the home or visited network of the IM subscriber, or it can be in a third party network as well. The network elements storing the trace activation information are distinguished in the figures by the striped boxes. The arrows indicating the forwarding of the trace activation are distinguished by the two parallel lines.

Figure 3:
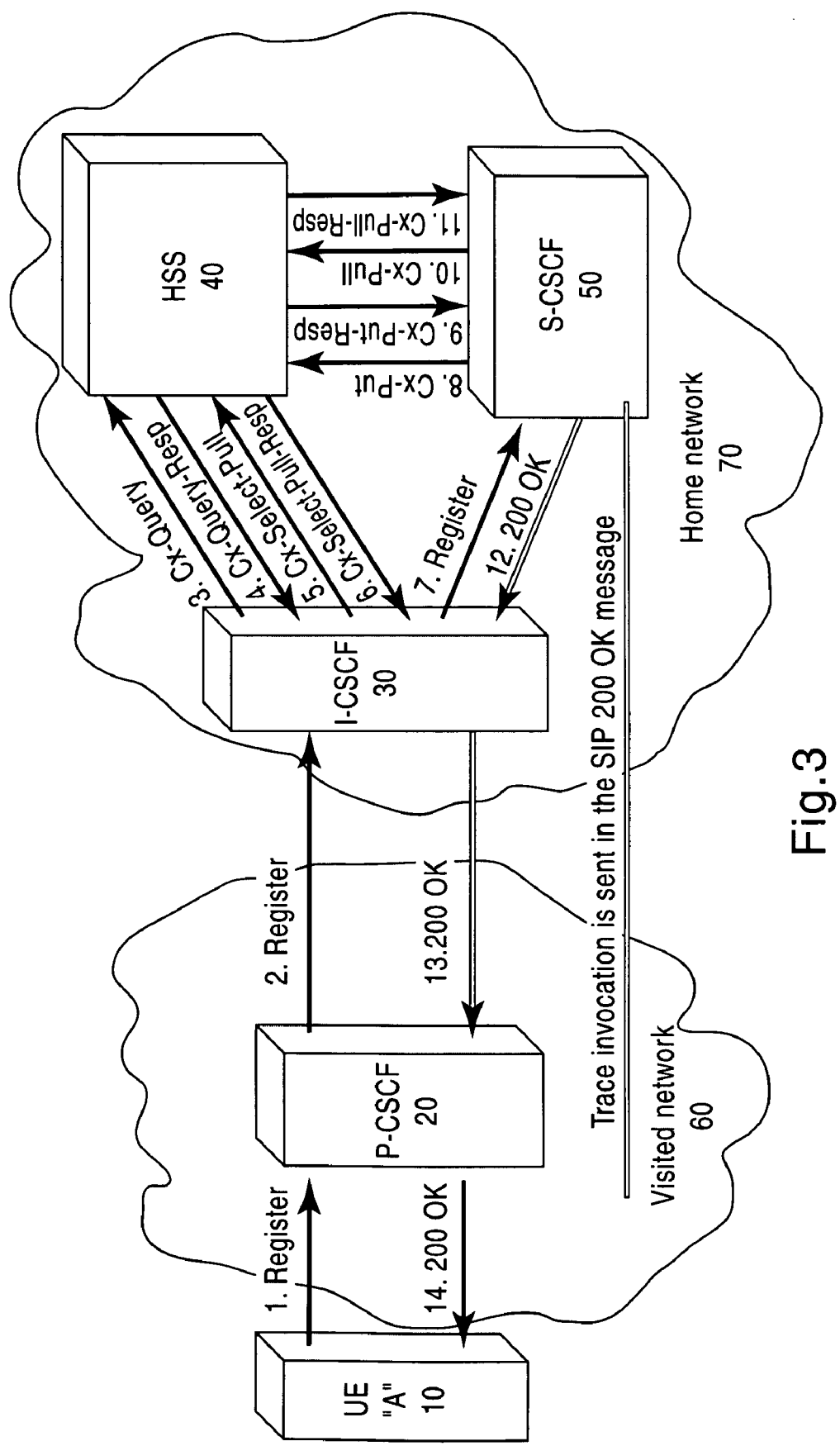
FIG. 3 shows a signaling diagram indicating an IM subscriber registration with trace invocation in the P-CSCF, according to another alternative of a first embodiment.

FIG. 3 shows a signaling diagram according to a modification of the first embodiment, where the trace has already been activated in a HSS 40, before the customer starts registration.

After the concerned UE 10 roaming in a visited network 60 has obtained a signaling channel through the access network, it can perform the IM registration as described in the 3GPP specification TS 23.228. To do so, the UE 10 sends in step 1 a register information flow (subscriber identity, home network's domain name) to a P-CSCF 20 which examines the home domain name to determine the entry point (i.e. I-CSCF 30) to the home network 70 based on a name-address resolution mechanism. Then, the P-CSCF 20 sends in step 2 the register information (P-CSCF's name in the contact header, subscriber identity, visited network's contact name) to the determined I-CSCF 30. Having received the register information, the I-CSCF 30 employs a name-address resolution mechanism to determine (e.g. based on the subscriber identity and home domain name) the address of a HSS 40 to be contacted. Then, the Cx registration signaling defined in TS 23.228 is performed in steps 3 to 6 between the I-CSCF 30 and the HSS 40 to obtain the S-CSCF capabilities at the I-CSCF 30. Based on these S-CSCF capabilities, the I-CSCF 30 derives the address of an S-CSCF 50 by using an S-CSCF selection function and a name-address resolution mechanism. Then, in step 7, the I-CSCF 30 sends the register information flow to the selected S-CSCF 50 which performs a Cx registration signaling defined in TS 23.228 with the HSS 40 (steps 8 to 11) to obtain information required to access a platform used for service control while the user is registered at his S-CSCF. In step 12, the S-CSCF 50 returns a SIP 200 OK message with a serving network contact name and a trace invocation to the I-CSCF 30 which forwards it to the P-CSCF 20 in the visited network 60. The P-CSCF 20 stores the serving network contact name and sends the 200 OK message to the UE 10.

Thereby, the trace invocation is sent in the SIP 200 OK message to the P-CSCF 20 in the serving network 60.

Figure 4:
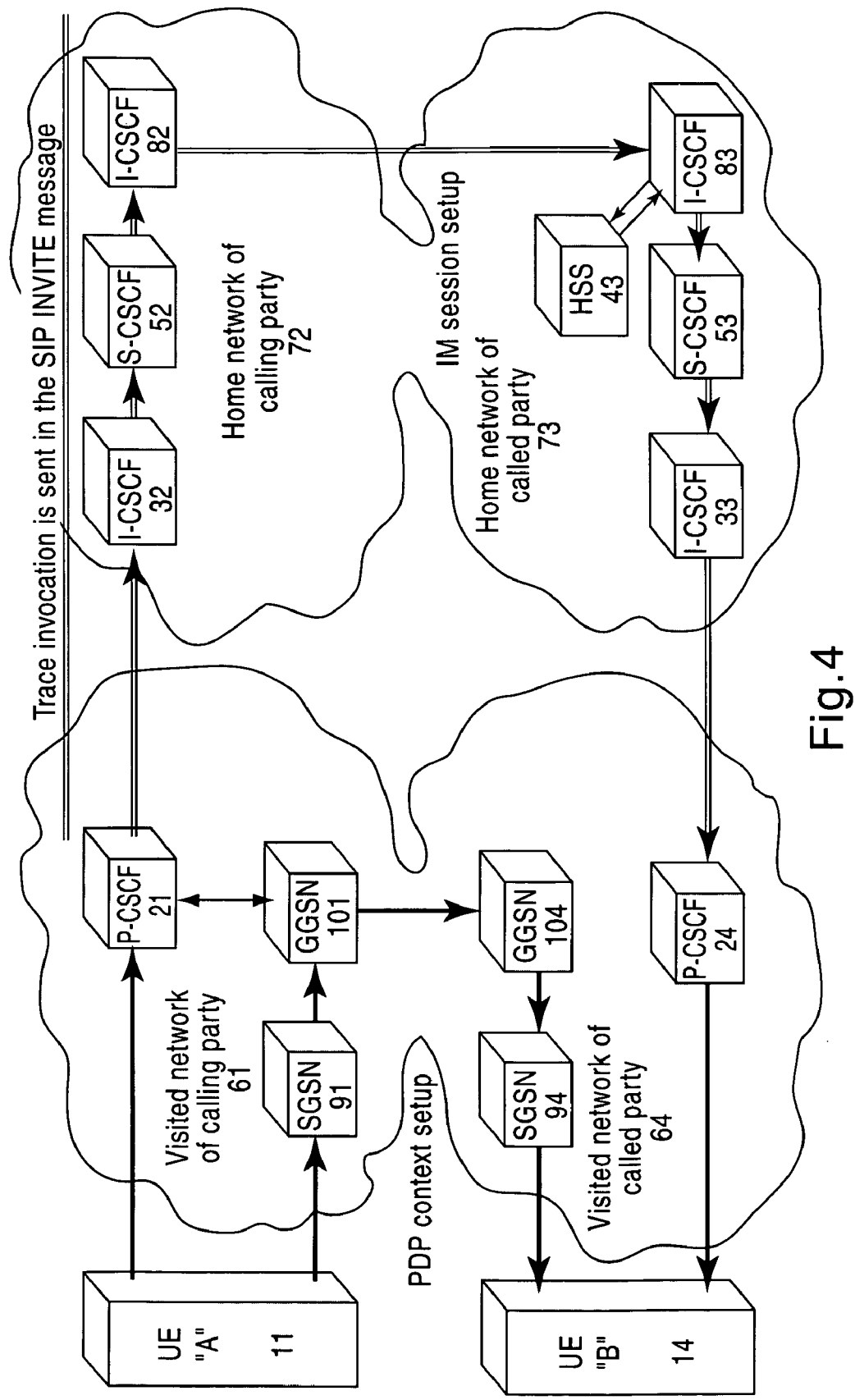
FIG. 4 shows a signaling diagram indicating an IM session setup according to a second embodiment, where the calling party is under trace.
Figure 5:
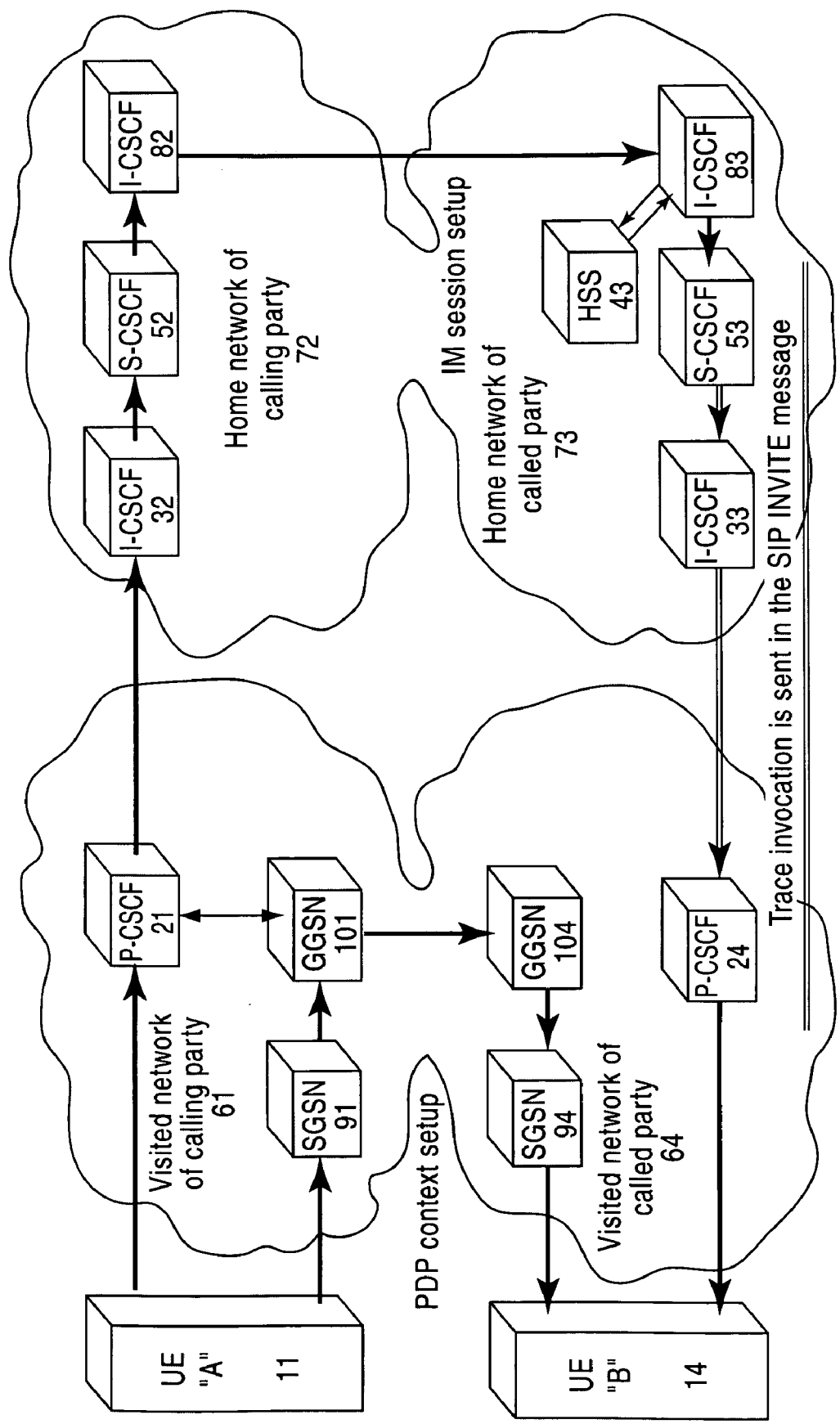
FIG. 5 shows a diagram indication the IM session setup according to the second embodiment, where the called party is under trace.

FIGS. 4 and 5 show a signaling diagram according to the second embodiment where an IM session setup is performed between two IM subscribers (UE "A" 11 and UE "B" 14), and the trace invocation is sent though a chain of network elements participating in session setup.

FIG. 4 shows the main use case of the session trace, when the calling party (UE "A" 11) is under trace. Here, the P-CSCF 21 of the visited network 61 of the calling UE 11 identifies that the calling party is under trace, and inserts the trace invocation in the SIP INVITE message. From this point on, all the involved network elements/functions are responsible to forward the INVITE message, with unchanged trace information, and to check it for creating the trace reports.

The P-CSCF 21 is the first contact point within the IM subsystem. Its address is determined by the calling UE 11 following a PDP context setup or activation during a GPRS (General Packet Radio Services) attach, as indicated in FIG. 4 by the arrow between the P-CSCF 21 and a GGSN 101. The UMTS packet switched domain or GPRS Support Nodes (GSNs) are the Gateway GSNs (GGSNs) 101, 104 and the Serving GSNs (SGSNs) 91, 94. They constitute the interface between the radio system and the fixed networks for packet switched services, and perform all necessary functions in order to handle the packet transmission to and from the mobile stations or UEs. The procedures for information transfer between the SGSN, the GGSN and the respective subscriber databases are defined in the specifications TS 23.016 and TS 23.060.

The determination of the P-CSCF 21 may be performed by using the Dynamic Host Configuration Protocol (DHCP) to provide the calling UE 11 with the domain name of the P-CSCF 21 and the address of the Domain Name Server (DNS) capable of resolving the P-CSCF name. As an alternative, the address of the P-CSCF 21 may be transferred within the PDP context activation signaling via the SGSN 91 and the GGSN 101 of the visited network 61 of the calling party and the GGSN 104 and the SGSN 94 of the visited network 64 of the calling party to the called UE 14, as indicated in FIG. 4.

Then, the SIP INVITE message is routed by an I-CSCF 32 of the home network 72 of the calling party to a selected S-CSCF 52 which forwards the INVITE message via an I-CSCF 82 to an I-CSCF 83 of the home network 73 of the called UE 14. Based on a signaling procedure with the HSS 43 of the home network 43, the I-CSCF 83 derives the required contact information for the visited network 64 of the called party. Then, the SIP INVITE message is forwarded to the P-CSCF 24 of the visited network 64.

However, there might be cases, where the P-CSCF 21 does not have the trace activation (e.g. subscriber is roaming to a foreign PLMN, where no agreement exists between the operators for trace, so that the trace activation was not sent from S-CSCF to P-CSCF). In that case, the S-CSCF 52 of the home network 72 of the calling party may insert the trace invocation information to the SIP INVITE message. This means, the S-CSCF 52 shall always check in its database, whether the trace is activated for the calling party.

It is noted that the trace information is not sent towards the called party, it is removed from the SIP INVITE message by the P-CSCF 24 of the called party.

FIG. 5 shows a signaling diagram according to the second embodiment, where the called party (i.e. UE "B" 14) was put under trace. In this case, the trace shall not be invoked in the visited 61 and home network 72 of the calling party. However, the S-CSCF 53 of the called party can derive from its database that the trace shall be invoked for the called party. Therefore, it inserts the trace invocation information in the SIP INVITE message. The trace is invoked in the I-CSCF 33 of the home network 73 of the called party and the called party's P-CSCF 24, similarly as described for FIG. 3.

Figure 6:
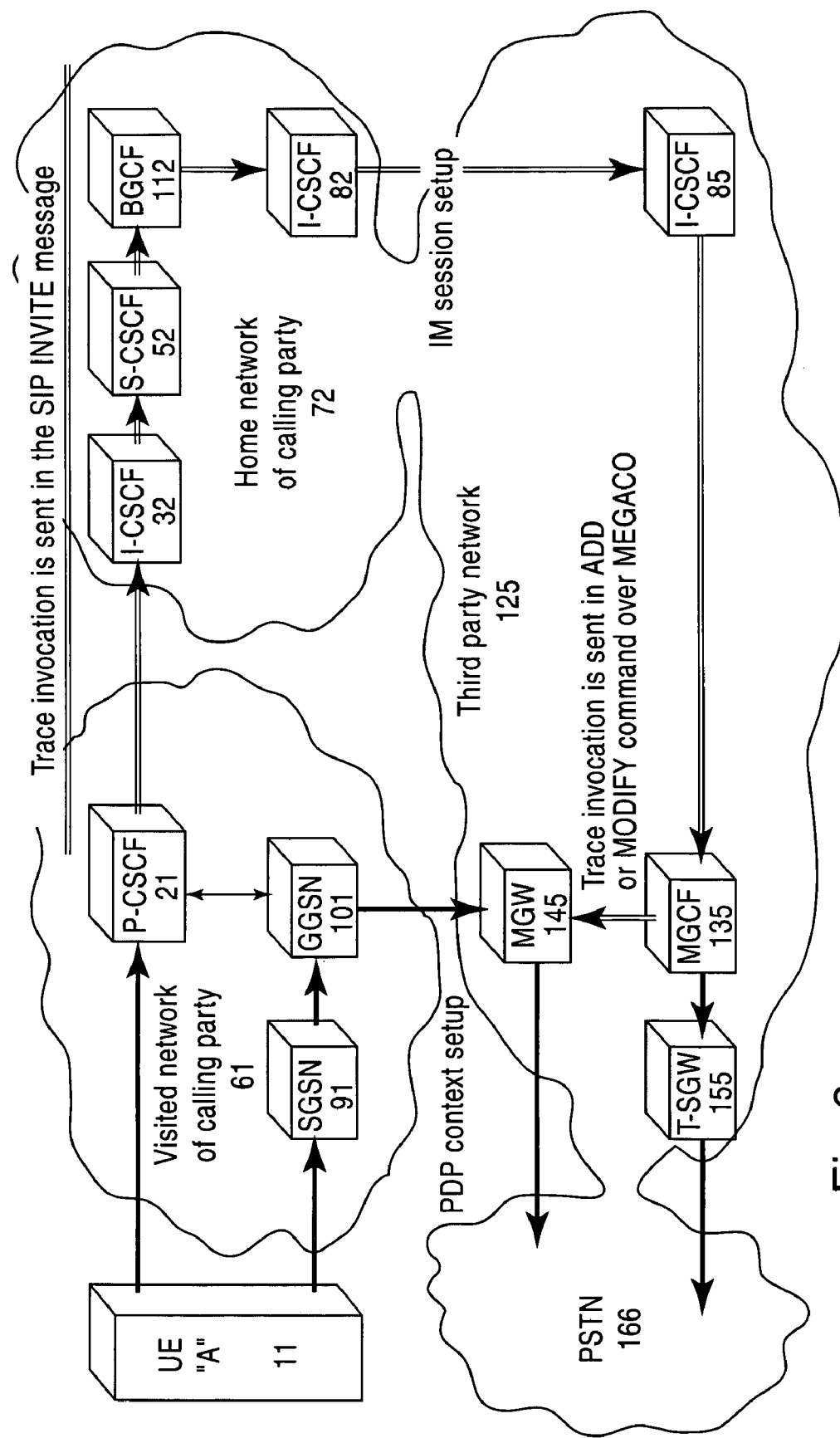
FIG. 6 shows a diagram indicating a session setup according to a third embodiment, when the call is terminated in the PSTN or in a GSM network and the calling party is under trace.

FIG. 6 shows a signaling diagram indicating session setup according to the third embodiment, where the call is terminated in a Public Switched Telephone Network (PSTN) 166 or in a GSM network, and the calling party (i.e. UE "A" 11) is under trace. Thus, the call is directed to a circuit switched network domain and therefore has to be routed through an MGW 145. Similar to the all-IP to all-IP session, the trace invocation information is inserted to the SIP INVITE message by the P-CSCF 21 (or by the S-CSCF 52, as described in connection with FIG. 4). The SIP INVITE message is forwarded with unchanged trace information through a BGCF 112 and I-CSCF(s) 82, 85 of the calling party's home network 72 and a third party network 125, to an MGCF 135. Each network element checks the INVITE message for trace invocation, and generates the report accordingly. The BGCF 112 is a control function which selects the network and MGCF in which PSTN breakout is to occur. In the present case, the BGCF 112 has selected the third party network 125 and the MGCF 135 which will be responsible for interworking with the desired PSTN 166 of the called party.

When the MGCF 135 receives the trace invocation, it invokes the trace also in the MGW 145 of the third party network 125. This can be achieved by inserting the trace invocation information into the ADD command sent over the Media Gateway Control (MEGACO) interface. In the present case, the PDP context activation is performed via the MGW 145 to the called party at the PSTN 166 to forward the address of the P-CSCF 21. Then, the MGCF 135 forwards the SIP INVITE message without trace invocation to the called party at the PSTN 166 via a Transport Signaling Gateway Function (T-SGW) 155. the T-SGW 155 is arranged to map call related signaling from/to the PSTN 166 on an IP bearer and to send it to/from the MGCF 135. Thus, the T-SGW 155 provides a PSTN⇌IP transport level address mapping.

Figure 7:
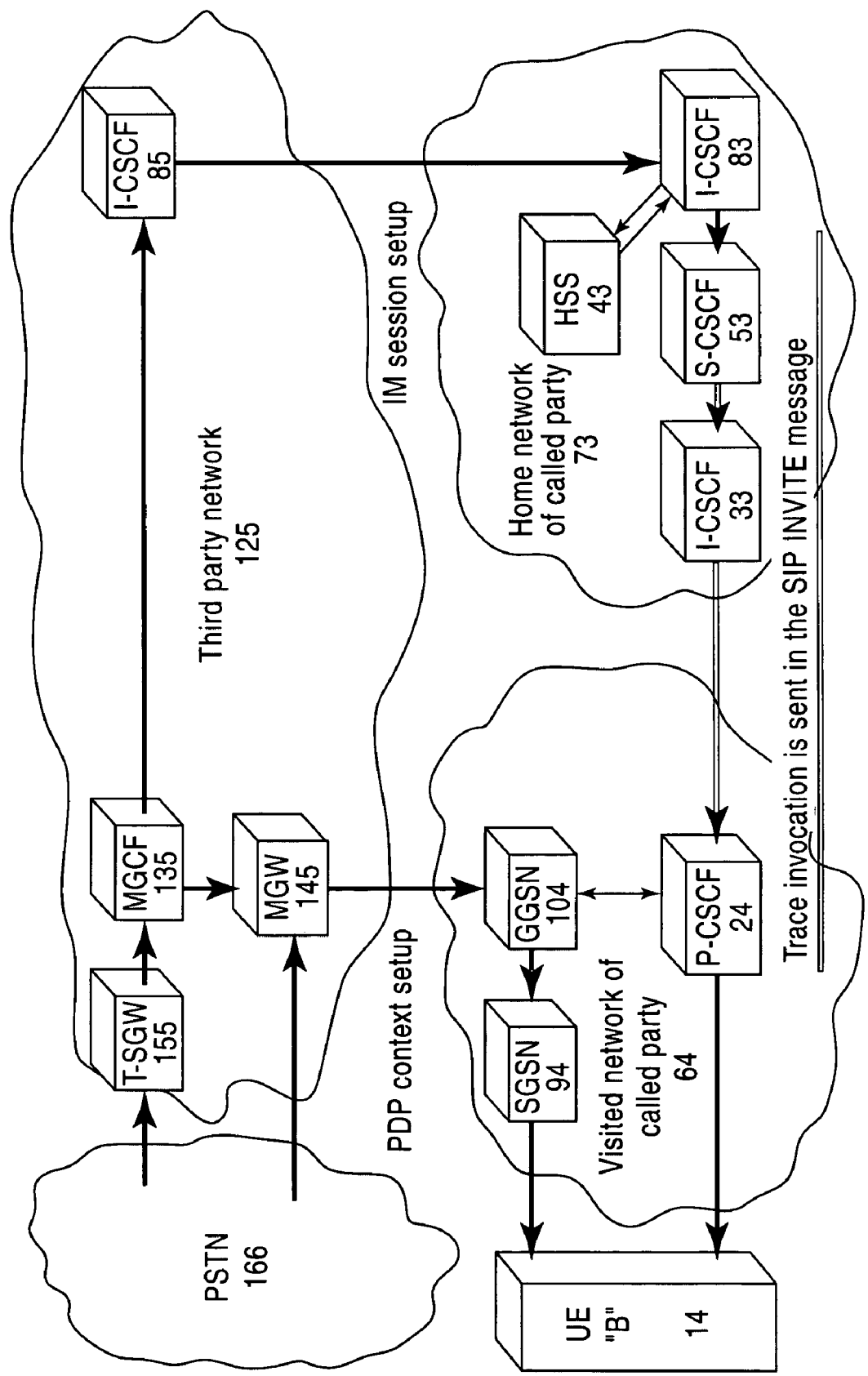
FIG. 7 shows a diagram indicating the session setup according to the third embodiment, when the call is initiated in the PSTN or GSM network and the called party is under trace.

FIG. 7 shows a signaling diagram indicating a session setup according to the third embodiment, where the call is initiated in the PSTN 166 or a GSM network. As regards trace invocation, this procedure is similar to the case shown in FIG. 5. The PSTN 166 establishes a bearer path to the MGW 145 of the third party network 125 and signals to the T-SGW 155 a destination information. The MGW 145 performs a PDP context setup or activation procedure via the GGSN 104 and the SGSN 94 at the called party's visited network 64. The SIP INVITE message is then generated at the MGCF 135 and routed via the I-CSCF 85 of the third party network 125 and the I-CSCF 83 of the called party's home network 73 to the S-CSCF 53 based on a query of the HSS 43. The S-CSCF 53 of the called party's home network 73 reads in its database that the trace shall be invoked for the called party and inserts the trace invocation information in the SIP INVITE message. The trace is then invoked in the I-CSCF 33 of the home network 73 and the P-CSCF 24 of the called party's visited network 64. Further details of activating/deactivating and invoking the session trace in the above preferred embodiments are described in the following.

In the centralized trace activation/deactivation according to the above first embodiment, the trace is activated for subscribers. The activation/deactivation happens in the HSS, which is the central storage place for subscribers' data. Therefore, the normal subscriber administration means can be used, e.g. using the OSF. In the HSS an option may be provided to invoke the trace also in the Packet Switched (PS) network domain or only in the IMS. When activating the trace, the operator may define a trace reference, which serves as the identifier for the trace reports.

In case of a trace activation in the S-CSCF, the subscribers' data is downloaded from a UMS to the S-CSCF during the registration, and the trace invocation data shall be included here. In the case of an any time trace activation/modification, it is assumed that there will be a standardized operation/transaction in the Cx interface, which ensures that modifications in the subscriber's data entered to HSS are replicated near-real time to the S-CSCF. The same means can be used for sending ("replicating") the trace activation data to the S-CSCF. In case of a local trace activation, the operator of the visited network has the means for activating a trace function for visitor subscribers, by its own decision. This can be done by administrative commands. This trace function can be put into an active pending state, if the given subscriber is not registered to that P-CSCF, and may become active when such registration happens.

In case of a trace activation in the P-CSCF (required only for session trace), the S-CSCF may check, during registration, after the subscriber data was downloaded to the S-CSCF, whether trace activation is included in it. If yes, the S-CSCF inserts that information in the 200 OK SIP message it sends back to the registering subscriber. Therefore, an optional SIP header can be used. Alternatively, it could be included in the payload of the SIP message as well. When the P-CSCF forwards the 200 OK message, it checks for the trace activation information and if it is present, the P-CSCF may store it locally (together with other subscriber related data, e.g. S-CSCF address), so that it can provide the trace reports for the given subscriber's sessions. It is noted that the P-CSCF removes the trace information from the 200 OK message, so the subscriber will not receive it.

In case of the any time trace activation/modification, the trace activation information received in the S-CSCF can be forwarded to the P-CSCF, using one of the methods described above. However, if such will not be used, the trace activation arriving at the S-CSCF can be forwarded only when a session is active, i.e. when SIP messages are sent between subscribers. Using this path, the S-CSCF can insert the trace activation information to any (e.g. the first) SIP message and thus forward it to the P-CSCF. An optional SIP message header may be used for that.

In case of the trace invocation in the I-CSCF(s), in S-CSCF and P-CSCF of the called party in IM sessions, none of the above network elements store the trace invocation data when the calling party is under trace. Consequently, the trace is invoked in these network elements in the session itself. If the trace has been activated in the S-CSCF and the P-CSCF, this can be done in the beginning of the session by inserting the trace invocation information in the SIP INVITE message. If trace activation arrives during an active session, this information is inserted by the S-CSCF in the first SIP message. In both cases, an optional header can be used in the SIP message. This allows the trace invocation also if not all the involved network elements have the trace function. Those that cannot interpret this optional header, will not generate a trace report, but they will forward the trace information.

It is assumed that the main usage of the trace function is to activate the trace function for the calling party. In this case, the trace can be invoked in all the network elements participating in the IM session setup. However, it is also possible to use the trace activated for the called party, but in this case, the trace is invoked only in the network elements that follow the S-CSCF of the called party in the session setup chain.

In case of the trace invocation in the I-CSCF(s), BGCF, MGCF in PSTN or GSM terminated IM sessions, none of these network elements store the trace invocation data. Consequently, the trace is invoked in these network elements in the session itself. This is done in the same way as described for the IM sessions above. If a trace is invoked in the MGW in PSTN or GSM terminated IM sessions, the MGCF may receive the trace activation in the SIP INVITE message. After selecting the proper MGW for the call, it will ask for user plane connection setup, by sending a MEGACO (H.248) ADD command over the Mc interface. The trace invocation information is inserted in this command. If the trace activation arrived at the S-CSCF (consequently at the MGCF) during an active session, the trace activation can be inserted in a MODIFY command, that can be sent to the MGW. Note that this solution can be used also in the 3$^{rd}$ generation CS core network and not only in PSTN or GSM terminated IM session.

In the S-CSCF and the P-CSCF, the trace can be deactivated by deregistration. In the S-CSCF, the trace can be deactivated any time, when receiving this information in the subscriber's data via the Cx interface. Towards the P-CSCF, the same mechanism may be used as for trace activation, or if no interface shall be defined. It can be executed at the beginning of the next active session. If the trace deactivation arrives with the first message of a session, the P-CSCF shall not provide a trace report for that session.

The IM session trace becomes "deactivated" automatically at the end of the SIP transaction in the I-CSCF, and BGCF and at the end of session in the MGCF as well as in the other (i.e. not traced) party's S-CSCF and P-CSCF, respectively. In the MGW, the trace is deactivated when the MGCF requests to release the reserved context.

When identifying that a subscriber is under trace or when receiving the trace activation, all the above mentioned network functions shall start collecting detailed information about the session under trace. At the end of the session, or right after the specific events, these reports are sent to the OSF for analysis. In order that the OSF is able to combine the data sent by several network functions. The SIP call ID may be included in the trace reports. The SIP call ID may also be sent over MEGACO to the MGW. The S-CSCF may also include the traced subscribers' public or private ID and the trace reference in the reports.

The invention can be implemented by building a trace activation and report generation intelligence in appropriate network elements for implementing the above described functions.

It should be appreciated that whilst embodiments of the present invention have been described in relation to user equipment such as mobile stations, embodiments of the present invention are applicable to any other suitable type of users.

The embodiments of the invention were discussed with reference to call state control function entities. Embodiments of the present invention can be applicable to other network elements where applicable.

The embodiment of the present invention has been described in the context of the Universal Mobile Telecommunication System (UMTS) 3G system and session initiation protocol (SIP), and more particularly, with reference to SIP 'SUBSCRIBE', 'MESSAGE', '200 OK', and 'INVITE' methods. This invention is also applicable to any other communication systems and protocols. Examples of other systems, without limiting to these, include the public internet and cable networks, provided that they utilise a control layer protocol supporting the event monitoring function (e.g. SIP). Any other SIP method may also be used for communication of the required information as well.

It is noted that the present invention is not restricted to the above described embodiment, and can be used for tracing a session/call in any multi-vendor network environment. In general, the concept of tracing in the MGW can be used in every network where the user plane and the control plane are separated. In this case, the subscriber/UE identity included in trace activation shall be different. For the Circuit Switched (CS) subsystem of UMTS network, the IMSI or IMEI can be used.

The invention claimed is:

1. A method comprising:
   tracing in a network environment having network elements with separate control and user plane functionality, said tracing comprising transmitting a trace invocation from a control plane network element to a user plane network element or to another control plane network element, wherein trace activation or deactivation is performed centrally in a home subscriber database of said second network, wherein said trace activation is performed from said home subscriber database to at least one of a serving call state control function of said second network and a proxy call state control function of said first network, and wherein a SIP 200 OK message comprising said trace invocation is returned from said serving call state control function to said proxy call state control function.

2. A method according to claim 1, wherein said home subscriber database is a home subscriber server.

3. A method according to claim 1, wherein said SIP INVITE message is forwarded by involved network elements or functions with unchanged trace information.

4. A method according to claim 3, wherein said trace information is removed from said SIP INVITE message by the proxy call state control function of the called party.

5. A method according to claim 3, wherein said trace information is checked at said involved network elements or functions for creating trace reports.

6. A method according to claim 3, wherein said SIP INVITE message is forwarded by a serving call state control function of said second network to said proxy call state control function which is arranged in said first network, based on a query of said home subscriber database.

7. A method according to claim 1, wherein a trace activation information is stored in said serving and proxy call state control functions.

8. A method comprising:
   tracing in a network environment having network elements with separate control and user plane functionality, said tracing comprising transmitting a trace invocation from a control plane network element to a user plane network element or to another control plane network element wherein said trace invocation is transmitted through a network border between a first and a second network of said network environment, and wherein said trace invocation is inserted in a SIP INVITE message by a serving call state control function of said first network based on a database check as to whether the trace is activated for the calling party.

9. A method according to claim 8, wherein subscriber data including said trace invocation is downloaded to said serving call state control function during registration.

10. A method according to claim 8, wherein an identification information comprises at least one of a trace reference ID, a private ID of the traced subscriber, a public ID of the traced subscriber, a call ID of the session protocol, and an ID of the invoking operator.

11. A method according to claim 8, wherein a trace report is combined with other trace reports received from several network elements.

12. A method comprising:
   of providing information about events in a communication system having network elements with separate control und user plane functionality;
   communicating to a first control entity of the communication system instructions to inform a processor entity about at least one event; and
   based on the received instructions, communicating a request from the first control entity to a second control entity of the communication system, said request containing instructions to inform the processor entity about at least one event associated with the second control entity,
   wherein the instructions are forwarded from the second control entity to at least one further control entity either in a modified request from the user equipment or in a generated request preceding a request from the user equipment.

13. A communication system comprising:
network elements with separate control und user plane functionality;
a processor entity;
a first control entity;
a second control entity;
a first communication entity for communicating to the first control entity instructions to inform the processor entity about at least one event;
a second communication entity for communication, based on the instructions received at the first control entity, from the first control entity to the second control entity of the communication system a request containing instructions to inform the processor entity about at least one event associated with the second control entity
wherein the first and second control entities are for provision of call state control functions;
wherein the first control entity comprises a serving call state control function and the second control entity provides a proxy call state control function.

14. A communication system as claimed in claim 13, comprising a storage entity adapted for storing information that associates with the user of the communication system, said user being the subject of the information provision operations.

15. A communication system as claimed in claim 13, wherein the request is a protocol message, said protocol being for use in provisioning of services for the users of the communication system.

16. A communication system as claimed in claim 13, wherein the first control entity and the second control entity are located in different communication networks.

17. A communication system comprising:
network elements with separate control and user plane functionality;
a processor entity;
a first control entity;
a second control entity;
a first communication entity for communicating to the first control entity instructions to inform the processor entity about at least one event;
a second communication entity for communication, based on the instructions received at the first control entity, from the first control entity to the second control entity of the communication system a request containing instructions to inform the processor entity about at least one event associated with the second control entity; and
at least one further control entity, wherein the second control entity is adapted to forward the instructions to said at least one further control entity.

18. A communication system as claimed in claim 17, wherein communicating from the first control entity to said at least one second control entity is either in a modified request from the user equipment or in a generated request preceding a request from the user equipment.

19. A communication system as claimed in claim 17, wherein the modified or generated request comprises a SIP protocol 'SUBSCRIBE' or "MESSAGE" or '200OK' or 'INVITE' request.

20. A communication system as claimed in claim 19, wherein the forwarding is adapted to occur in response to a detected event.

21. A system comprising:
providing means for providing information regarding at least one entity associated with a communication system having network elements with separate control und user plane functionality;
first communicating means for communicating, from a management entity to a first control entity of the system, instructions to inform the management entity about at least one event;
second communicating means for communicating, based on the received instructions, from the first control entity to a second control entity of the system a request to inform the management entity about at least one event associated with the second control entity;
processing means for processing, in response to detection of said at least one event reported to said management unit, the received report at the management entity; and
forwarding means for forwarding the instructions from the first control entity to at least one further control entity either in a modified request from the user equipment or in a generated request preceding a request from the user equipment.

* * * * *